(12) United States Patent
Guillot et al.

(10) Patent No.: US 11,114,940 B2
(45) Date of Patent: Sep. 7, 2021

(54) HALF-BRIDGE ELECTRONIC DEVICE COMPRISING TWO SYSTEMS FOR MINIMIZING DEAD-TIME BETWEEN THE SWITCHING OPERATIONS OF A HIGH LEVEL SWITCH AND OF A LOW LEVEL SWITCH

(71) Applicant: Exagan, Grenoble (FR)

(72) Inventors: Laurent Guillot, Seysses (FR); Thierry Sutto, Seysses (FR); Alain Bailly, Rousset (FR)

(73) Assignee: Exagan, Grenoble (FR)

( * ) Notice: Subject to any disclaimer, the term of this patent is extended or adjusted under 35 U.S.C. 154(b) by 0 days.

(21) Appl. No.: 16/628,236

(22) PCT Filed: May 17, 2018

(86) PCT No.: PCT/FR2018/051185
§ 371 (c)(1),
(2) Date: Jan. 2, 2020

(87) PCT Pub. No.: WO2019/012192
PCT Pub. Date: Jan. 17, 2019

(65) Prior Publication Data
US 2020/0403508 A1     Dec. 24, 2020

(30) Foreign Application Priority Data
Jul. 10, 2017   (FR) ...................................... 1756490

(51) Int. Cl.
*H02M 3/158*     (2006.01)
*H02M 1/38*      (2007.01)

(52) U.S. Cl.
CPC ............. *H02M 3/158* (2013.01); *H02M 1/38* (2013.01); *H02M 2001/385* (2013.01)

(58) Field of Classification Search
CPC ...... H02M 3/158; H02M 1/38; H02M 3/1588; H02M 3/156; H02M 2001/385;
(Continued)

(56) References Cited

U.S. PATENT DOCUMENTS 4,365,217 A * 12/1982 Berger ................ H03H 19/004
                                                  333/165
8,138,739 B1    3/2012 Eirea et al.
(Continued)

FOREIGN PATENT DOCUMENTS

DE     102010030134 B4    6/2013

OTHER PUBLICATIONS

International Search Report for International Application No. PCT/FR2018/051185 dated Aug. 31, 2018, 2 pages.
(Continued)

*Primary Examiner* — Gustavo A Rosario-Benitez
(74) *Attorney, Agent, or Firm* — TraskBritt (57) ABSTRACT

A half-bridge electronic device comprises a high level switch and a low level switch in series that are connected at a central point, and a first and a second synchronization system: • the first system comprising a first detection circuit configured to interpret a variation, following a falling edge, of the voltage (Vm) at the central point, and the first system being configured to generate a first synchronization signal (ATON-LS) for activating the low level switch; • the second system comprising a second detection circuit configured to interpret a variation, following a rising edge, of the voltage (Vm) at the central point, and the second system being configured to generate a second synchronization signal (ATON-HS) for activating the high level switch.

15 Claims, 4 Drawing Sheets

(58) Field of Classification Search
CPC ...... H02M 7/217; H02M 7/537; H03K 17/28; H03K 17/284; H03K 17/165
See application file for complete search history.

(56) References Cited

U.S. PATENT DOCUMENTS

| | | | | |
|---|---|---|---|---|
| 8,587,031 | B2* | 11/2013 | Lu | H01L 29/7787 257/194 |
| 9,793,811 | B2* | 10/2017 | Noh | H02M 3/1588 |
| 10,374,599 | B2* | 8/2019 | Hokazono | H02H 3/247 |
| 2001/0036085 | A1 | 11/2001 | Narita | |
| 2001/0037066 | A1 | 11/2001 | Smith | |
| 2005/0128776 | A1* | 6/2005 | Dequina | H02M 1/088 363/89 |
| 2006/0164867 | A1* | 7/2006 | Dikken | H02M 3/1588 363/13 |
| 2009/0273957 | A1* | 11/2009 | Feldtkeller | H02M 3/1563 363/98 |
| 2009/0278621 | A1* | 11/2009 | Kris | H03K 5/1515 332/109 |
| 2011/0012577 | A1* | 1/2011 | Wang | H02M 1/38 323/283 |
| 2012/0105045 | A1* | 5/2012 | Burns | H02M 1/38 323/311 |
| 2017/0040894 | A1* | 2/2017 | MeVay | H02M 1/38 |
| 2018/0006566 | A1* | 1/2018 | Bronson | H03K 17/165 |
| 2018/0131282 | A1* | 5/2018 | Chen | H02M 1/38 |

OTHER PUBLICATIONS

International Written Opinion for International Application No. PCT/FR2018/051185 dated Aug. 31, 2018, 7 pages.
French Search Report from National Institute of Industrial Property for Application No. 1756490, dated Mar. 8, 2018, 2 pages.

* cited by examiner

HALF-BRIDGE ELECTRONIC DEVICE COMPRISING TWO SYSTEMS FOR MINIMIZING DEAD-TIME BETWEEN THE SWITCHING OPERATIONS OF A HIGH LEVEL SWITCH AND OF A LOW LEVEL SWITCH

CROSS-REFERENCE TO RELATED APPLICATIONS

This application is a national phase entry under 35 U.S.C. § 371 of International Patent Application PCT/FR2018/051185, filed May 17, 2018, designating the United States of America and published as International Patent Publication WO 2019/012192 A1 on Jan. 17, 2019, which claims the benefit under Article 8 of the Patent Cooperation Treaty to French Patent Application Serial No. 1756490, filed Jul. 10, 2017.

TECHNICAL FIELD

The present disclosure relates to the field of power electronics. In particular, it concerns a half-bridge electronic device comprising two synchronization systems to minimize dead times between the alternating activation of a high level switch and a low level switch, the device being used, in particular, in a DC-DC converter.

BACKGROUND

Electronic devices called "half bridges, " consisting of a high-side switch and a low-side switch, are commonly used in DC-DC converters to convert one DC voltage into another voltage of a lower value.

In these half-bridge devices, the two switches, formed by transistors, are connected in series at a mid-point, to which a load is connected. As already known in the field of DC-DC converters, the load is selectively coupled either to the DC voltage source, by activating (switching to pass mode) the high-side switch, or to ground, by activating the low-side switch.

A DC-DC converter can suffer significant electrical losses due to the dead time between deactivation (locking mode) of the high-side switch and activation of the low-side switch, and between deactivation of the low-side switch and activation of the high-side switch.

To maximize the efficiency of the converter, it is therefore desirable to minimize these switching dead times, while avoiding simultaneous conduction of the high-side and low-side switches that would cause a short circuit between the voltage source and ground.

In the previous art, some control systems exist that are implemented in half-bridge electronic devices to optimize switching dead times. In particular, documents U.S. Pat. Nos. 6,396,250 and 6,861,826 provide control systems for synchronizing the activation and deactivation of high-side and low-side switches in a converter, using mid-point voltage measurement.

With the implementation of fast switching switches (in particular, formed from GaN transistors) in half-bridge electronic devices, an additional constraint appears: the typical switching times of these switches going from a hundred nanoseconds to about ten nanoseconds, the measurement, analysis and response time of the control system must be of the same order of magnitude, to effectively minimize dead times between switch switching.

BRIEF SUMMARY

One aim of the present disclosure is to provide an alternative solution to the solutions of the prior art. An object of the present disclosure relates to a half-bridge electronic device comprising two synchronization systems to effectively minimize dead times between successive switch operations.

The present disclosure concerns a half-bridge electronic device, comprising in series a high level switch and a low level switch, connected at a mid-point. The low level switch and the high level switch are controlled (activated or deactivated) by a first ($S_{LS}$) and a second (Sus) activation/deactivation signal, respectively. The device includes a first and a second synchronization system:

the first synchronization system includes a first detection circuit configured to interpret a variation, along a falling edge, of the voltage at the midpoint, and the first synchronization system is configured to generate a first synchronization signal;

the second synchronization system includes a second detection circuit configured to interpret a variation, along a rising edge, of the voltage at the midpoint, and the second synchronization system is configured to generate a second synchronization signal;

The device further comprises:

an OR logic gate combining the first synchronization signal with a first control signal, to form the first activation/deactivation signal;

another OR logic gate combining the second synchronization signal with a second control signal, to form the second activation/deactivation signal;

According to other advantageous and non-limiting characteristics of the present disclosure, taken alone or in any technically feasible combination:

each detection circuit includes a capacitive element directly connected to the midpoint and used to generate a transient current depending on the voltages at the midpoint;

each detection circuit includes, in series with the capacitive element, a diode and a shunt resistance, for measuring a voltage proportional to the transient current;

each synchronization system includes a processing circuit configured to generate, from the measurements of the detection circuit, the synchronization signal for the activation of the associated switch;

each processing circuit includes a voltage comparator and a memory point;

at least one of the switches includes a high-voltage transistor the high-voltage transistor is formed on the basis of GaN;

at least one of the switches includes a high voltage transistor in depletion mode in series with a low voltage transistor in enrichment mode;

The present disclosure also concerns a process for synchronizing the alternating activation of a low level switch and a high level switch in a half-bridge electronic device. The process includes the following steps:

a) deactivating the low level switch when a first control signal changes to state 0, b) interpreting a variation following a rising edge of the voltage at the mid-point to generate a second synchronization signal capable of activating the high level switch, c) activating the high level switch, by a second activation/deactivation signal resulting from combining the second synchronization signal with a second control signal in an OR logic gate, d) deactivating the high level switch when a second control signal changes to state 0, e) interpreting a variation following a falling edge of the voltage at the mid-point to generate a first synchronization signal capable of activating the low level switch, f) activating the low level switch, by a first activation/deactivation signal resulting from combining the first synchronization signal with the first control signal in an OR logic gate, According to other advantageous and non-limiting characteristics of the present disclosure, taken alone or in any technically feasible combination:

steps a) to f) are repeated for each new cycle of alternating switching of the low level switch and the high level switch r the process consists of a step c'), between step c) and step d), to reset the second synchronization signal;

the process comprises a step f'), between step f) and the repetition of step a), of resetting the first synchronization signal;

the interpretation of the rising edge includes the detection of a determined high level of voltage at the mid-point;

the interpretation of the falling edge includes the detection of a determined low level of voltage at the mid-point;

BRIEF DESCRIPTION OF THE DRAWINGS

Other characteristics and advantages of the present disclosure will emerge from the detailed description hereunder while referring to the appended figures whereon.

DETAILED DESCRIPTION

In the descriptive part, the same references in the figures can be used for elements of the same type.

The present disclosure concerns a half-bridge electronic device 100, comprising a high level switch 2 and a low level switch 1 in series.

Figure 1A:
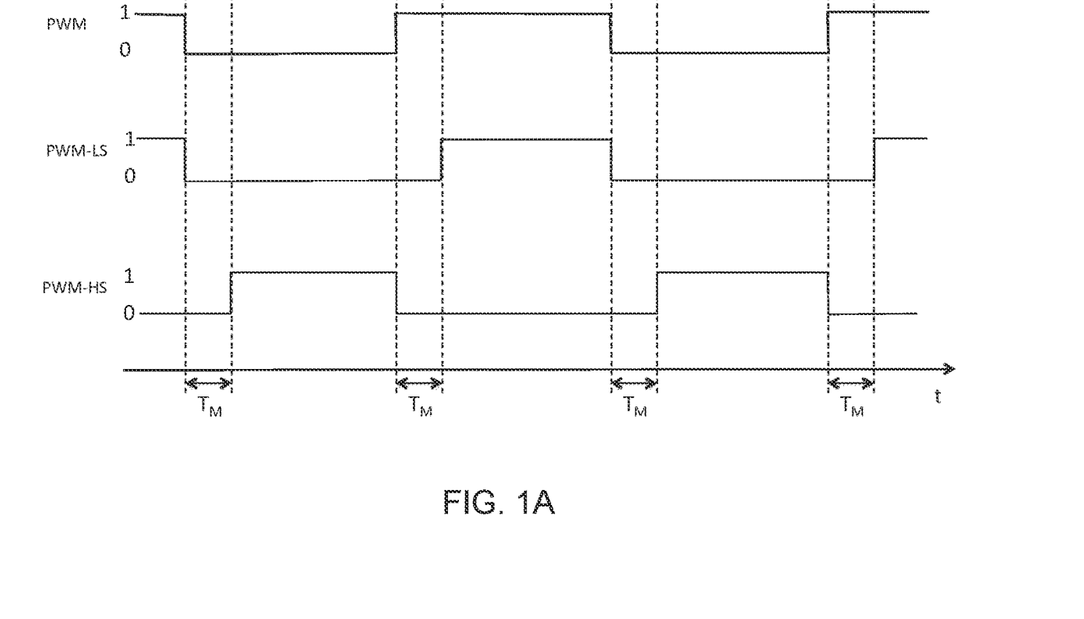
FIGS. 1A and 1B present, respectively, a chronogram and a principle diagram of a half-bridge electronic device according to the state of the art.
Figure 1B:
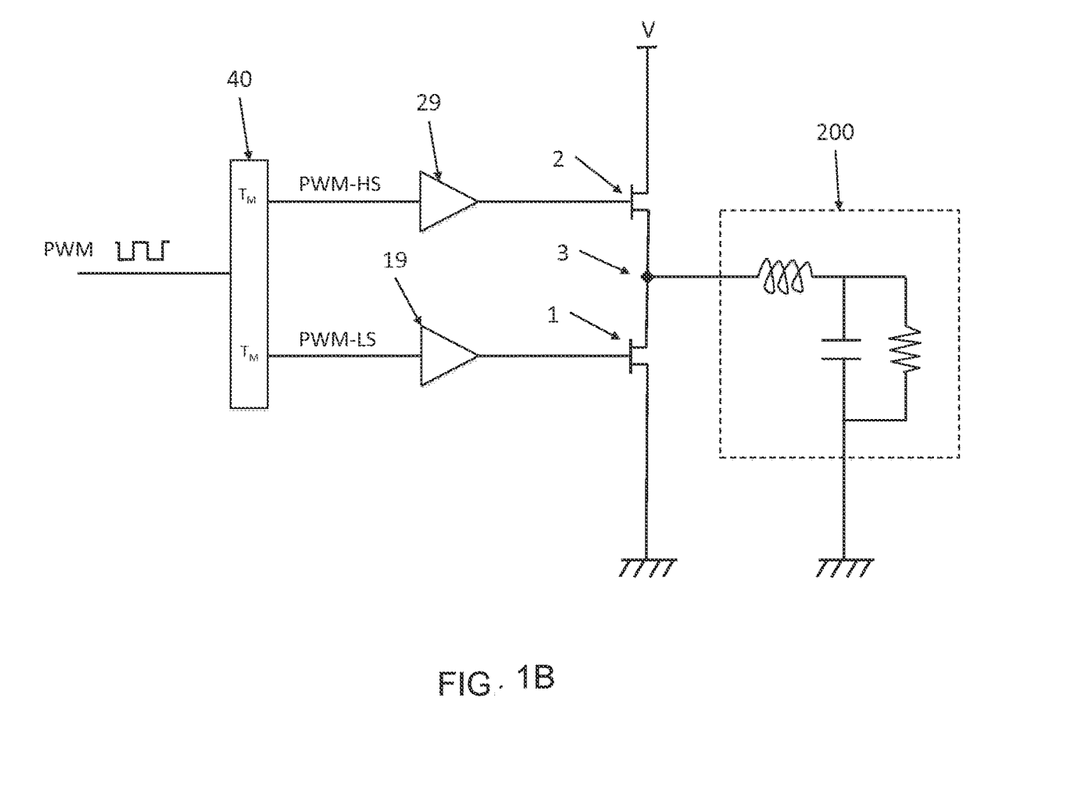

Typically, in such a device, the two switches 1, 2 are connected to each other at a midpoint 3 (FIG. 1b). The high level switch 2 is also connected to a voltage source V, which can be a high voltage source (from a few ten volts to a few hundred volts); the low level switch 1 is also connected to ground. A load 200, for example, as shown in FIG. 1b, is intended to be connected to midpoint 3.

According to a standard operating mode, a PWM ("pulse width modulation") input signal is sent to the low level 1 and high level 2 switches via a first control circuit 19 and a second control circuit 29, respectively. The PWM input signal is reflected in pulses to activate and deactivate the high level switch 2 and alternately deactivate and activate the low level switch 1. By activating, in the context of the present disclosure, what is meant is the action of closing the switch to make it pass through; by deactivating, what is meant is the action of opening the switch to make it lockable.

To avoid any short circuit related to an activation of both switches 1, 2 simultaneously, it is necessary to plan dead times $T_M$ between the deactivation of one switch and the activation of the other (FIG. 1a).

A delay generation device 40 (FIG. 1b), receiving the PWM input signal, generates a PWM-LS control signal (called the first control signal), of the same polarity as the PWM input signal, and whose pulses (activated state 1) are offset by a time $T_M$ with respect to the PWM input signal. The delay generation device 40 also generates a PWM-HS control signal (called the second control signal), of reversed polarity with respect to the PWM input signal, and whose pulses (activated state 1) are offset by a time $T_M$ with respect to the PWM input signal.

The first control circuit 19 receives as input the first control signal PWM-LS, which will control the activation/deactivation of the low level switch 1. The second control circuit 29 receives as input the second control signal PWM-HS (of reverse polarity with respect to the first control signal PWM-LS), which will control the activation/deactivation of the high level switch 2.

Of course, as previously stated, the induced $T_M$ dead times (FIG. 1a) must be minimized as much as possible to avoid significant electrical losses in a converter that would include the device 100.

Figure 2:
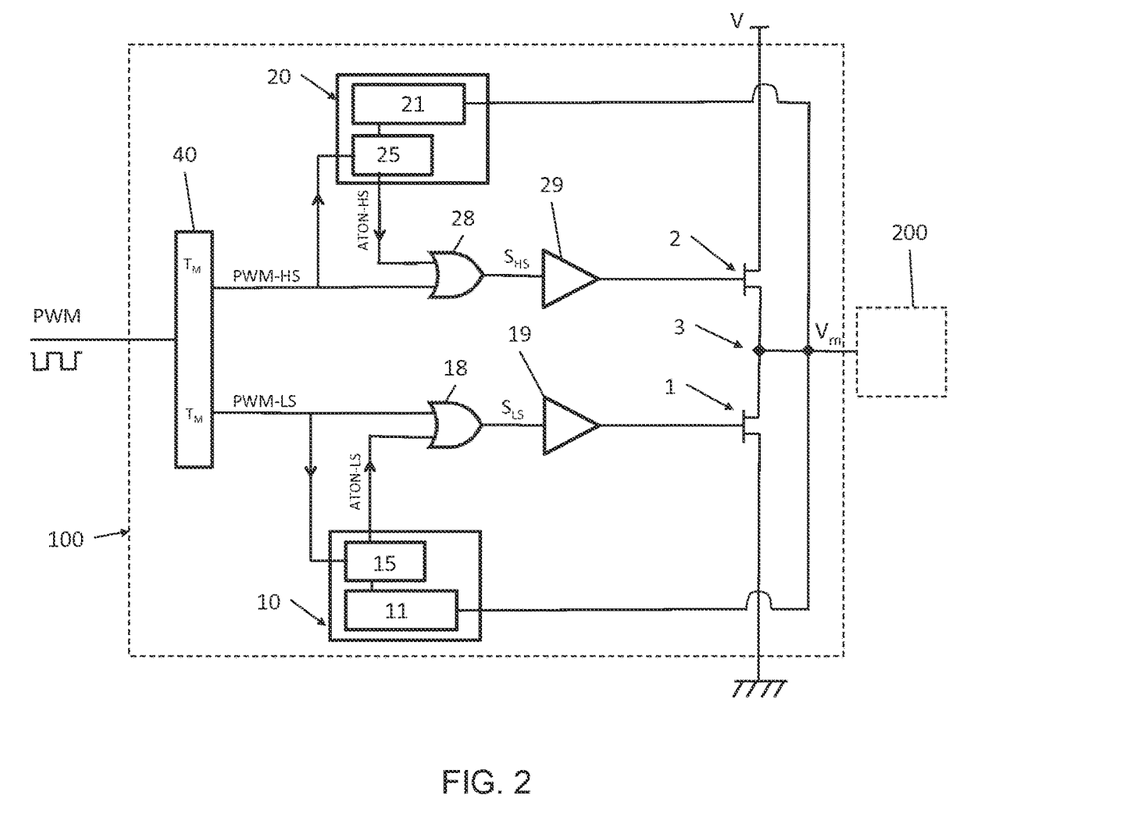
FIG. 2 shows a principle diagram of an electronic device in line with the present disclosure.

The device 100 according to the present disclosure includes a first 10 and a second 20 synchronization system, respectively, intended to send an ATON-LS ("Automatic Turn ON—Low Side") synchronization signal to enable the activation of the low level switch 1, and an ATON-HS ("Automatic Turn ON—High Side") synchronization signal to enable the activation of the high level switch 2 (FIG. 2).

Each synchronization system 10, 20 includes a detection circuit 11, 21 to interpret the variation over time (dVm/dt) of the voltage Vm at midpoint 3. As shown in the chronogram in FIG. 3, the voltage Vm at midpoint 3 will vary over time, depending on whether the high level switch 2 or low level switch 1 is activated (closed) or deactivated (open), respectively. In practice, the voltage Vm at midpoint 3 will decrease as soon as the high level switch 2 opens (deactivation); it will increase as soon as the low level switch 1 opens (deactivation).

The first detection circuit 11, included in the first synchronization system 10, is configured to detect the voltage Vm falling edges at midpoint 3. The second detection circuit 21, included in the second synchronization system 20, is configured to detect the voltage Vm rising edges at midpoint 3.

Figure 4A:
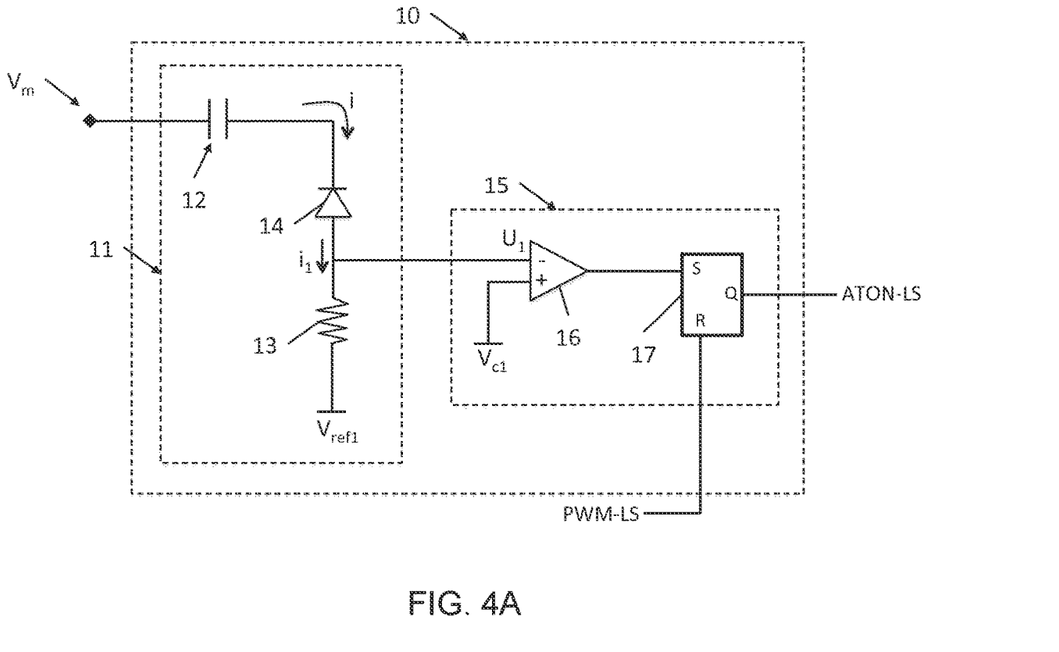
FIGS. 4A and 4B show synchronization systems for a half-bridge electronic device according to an embodiment of the present disclosure.
Figure 4B:
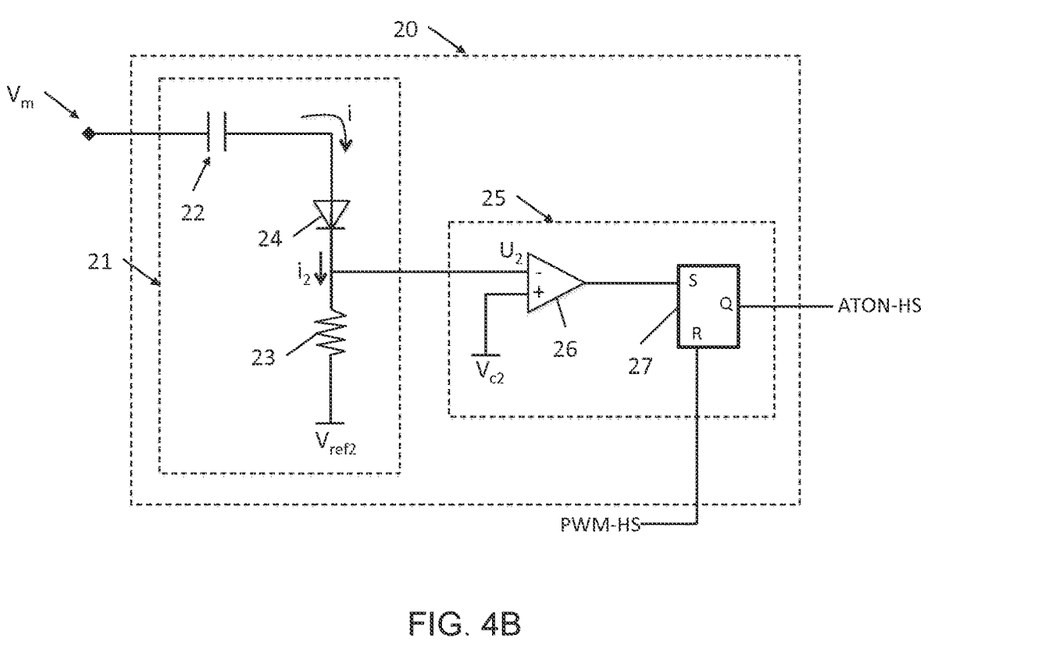

For this purpose, each detection circuit 11, 21 advantageously includes a capacitive element 12, 22 directly connected to midpoint 3 (FIGS. 4a, 4b). This capacitive element 12, 22 will generate a transient current i depending on the time variation of the voltage Vm at midpoint 3. The capacitive element 12, 22 must be compatible with the maximum level that the voltage Vm can reach at midpoint 3, i.e., at least the voltage V of the voltage source connected to the high level switch 2. The use of a capacitive element 12, 22 makes it possible to free oneself in the detection circuit 11, 21 from an active measuring component capable of holding the voltage V of the voltage source. For example, the capacitive element 12, 22 could consist of a capacitance sized according to the voltage V of the voltage source (from a few ten volts to a few hundred volts). Another advantageous example is that the capacitive element 12, 22 can consist of two coplanar metal lines arranged on a printed circuit board incorporating the device 100, also dimensioned according to the voltage V of the voltage source.

According to a first embodiment (not shown), the transient current i can be measured directly by an ammeter, connected in series with the capacitive element 12, 22.

According to a second, more advantageous embodiment, each detection circuit 11, 21 includes, in series with the capacitive element 12, 22, a shunt resistance 13, 23 (FIGS. 4a, 4b). It allows to measure at its terminals, a voltage $U_1$, $U_2$ proportional to the transient current i. Each detection circuit 11, 21 can thus produce a measurement of the voltage $U_1$, $U_2$, which is representative of the variations in the voltage Vm at midpoint 3.

Advantageously, each detection circuit 11, 21 also includes a diode 14, 24, in series with the shunt resistor 13, 23, the latter being connected to ground or to a reference voltage $V_{ref1}$, $V_{ref2}$.

Diode 14, 24 only allows the transient current i to pass through the shunt resistance 13, 23 for a defined polarity. Depending on whether the voltage Vm at midpoint 3 varies according to a falling or rising edge, the transient current i generated at the output of the capacitive element 12, 22 will be positive or negative. Thus, diode 14 is configured to allow only the passage of transient current i1 related to a falling edge of the voltage Vm at midpoint 3, while diode 24 is configured to allow only the passage of transient current i2 (of opposite sign to $i_1$) related to a rising edge of the voltage Vm at midpoint 3.

The first detection circuit 11 is thus configured to interpret a falling edge of the voltage Vm at midpoint 3: it allows a direct or indirect measurement of the transient current due to a decreasing temporal variation (falling edge) of the voltage Vm at midpoint 3.

From this measurement, the first synchronization system 10 must generate a first ATON-LS synchronization signal to enable the activation of the low level switch 1.

Figure 3:
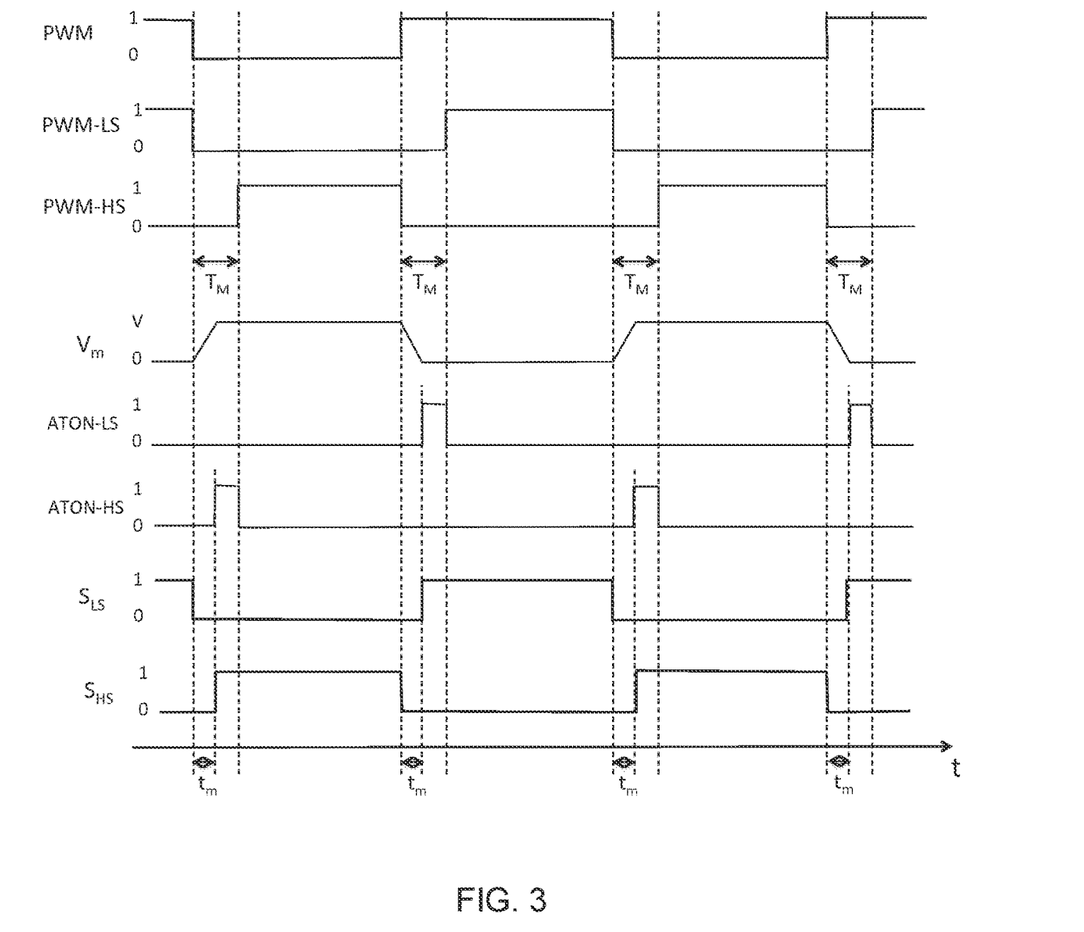
FIG. 3 shows a chronogram of the control signals, synchronization signals and activation signals of the switches of the half-bridge electronic device according to an embodiment of the present disclosure.

For this purpose, the first synchronization system 10 advantageously includes a first processing circuit 15. This treatment circuit 15 includes a voltage comparator 16, which will compare the value of the measured voltage $U_1$ (proportional to the transient current $i_1$, according to the second embodiment described above) with a setpoint voltage Va. As soon as the measured voltage $U_1$ is higher than the setpoint voltage $V_{c1}$, the comparator 16 will send a pulse to a memory point 17. This pulse passes the ATON-LS synchronization signal (called the first synchronization signal), at the output of memory point 17, into an activated state 1 (FIG. 3). For example, memory point 17 can be realized by an asynchronous switch (lock or "latch"). Memory point 17 (ATON-LS) is reset as soon as the PWM-LS control signal changes to state 1 (FIG. 3).

The first ATON-LS synchronization signal, generated by the first synchronization system 10, and the first PWM-LS control signal are then combined in a logic gate 18 of OR type, to form an $S_{HS}$ activation/deactivation signal (called the first activation/deactivation signal) (FIG. 3). The first $S_{LS}$ activation/deactivation signal is transmitted to the first control circuit 19 and will activate/deactivate the low level switch 1.

In the first synchronization system 10, the difference between the setpoint voltage and the reference voltage ($V_{c1}$-$V_{ref1}$) is used to adjust the switching level ($U_1$>$V_{c1}$) of the voltage comparator 16, to create the ATON-LS signal. Adjusting this level compensates for the system's delay time: for example, this voltage difference can be defined so that the ATON-LS signal is activated in state 1 substantially before Vm reaches its minimum value.

The second detection circuit 21 is configured to interpret a rising edge of the voltage Vm at midpoint 3: it allows a direct or indirect measurement of the transient current i2 due to an increasing temporal variation (rising edge) of the voltage Vm at midpoint 3.

From this measurement, the second synchronization system 20 must generate a, ATON-HS synchronization signal to enable the activation of the high level switch 2.

For this purpose, the second synchronization system 20 advantageously includes a second processing circuit 25. This treatment circuit 25 includes a voltage comparator 26, which will compare the value of the measured voltage $U_2$ (proportional to the transient current i2, according to the second embodiment described above) with a setpoint voltage $V_{c2}$. As soon as the measured voltage $U_2$ is higher than the setpoint voltage $V_{c2}$, the comparator 26 will send a pulse to a memory point 27. This pulse passes the ATON-HS synchronization signal (called the second synchronization signal), at the output of memory point 27, into an activated state 1. For example, memory point 27 can be realized by an asynchronous switchover. Memory point 27 (ATON-HS) is reset as soon as the PWM-HS control signal changes to state 1 (FIG. 3).

The second ATON-HS synchronization signal, generated by the second synchronization system 20, and the second PWM-HS control signal are then combined in a logic gate 28 of OR type, to form an $S_{HS}$ activation/deactivation signal (called the second activation/deactivation signal) (FIG. 3). The second $S_{HS}$ activation/deactivation signal is transmitted to the second control circuit 29 and will activate/deactivate the high level switch 2.

In the second synchronization system 20, the difference between the setpoint voltage and the reference voltage ($V_{c2}$-$V_{ref2}$) is used to adjust the switching level ($U_2$>$V_{c2}$) of the voltage comparator 26, to create the ATON-HS signal. Adjusting this level allows to compensate for the system's delay time: for example, this voltage difference can be defined so that the ATON-HS signal is activated in state 1 substantially before Vm reaches its maximum value.

As shown in the chronogram in FIG. 3, the first and second $S_{LS}$, $S_{HS}$ activation/deactivation signals reduce the dead times tm compared to the control signals PWM-LS, PWM-HS with fixed delay $T_M$. Indeed, starting from a fixed time delay $T_M$ defined (for example 50 to 100 ns) between the control signals PWM-LS, PWM-HS, the synchronization signals ATON-LS and ATON-HS are able to switch to phase advance, in state 1, respectively, the first $S_{LS}$ and the second $S_{HS}$ activation/deactivation signal controlling the low level 1 and high level 2 switches: this allows to reduce the effective dead times tm (for example between 4 to 20 ns). The $T_M$ fixed delay will preferably be chosen to be safe (long enough) to avoid any risk of simultaneous conduction of the "high-side" and "low-side" switches that would cause a short circuit between the voltage source and the ground.

The optimization of dead times makes it possible to minimize losses and thus maximize the output (or energy efficiency) of the converter equipped with the device 100.

The synchronization signals ATON-LS and ATON-HS are generated for each switching cycle of the low level 1 and high level 2 switches; the device 100 according to the present disclosure therefore allows an automatic activation (setting in state 1) of one switch 1, 2 at each switching cycle, and at the earliest after the deactivation of the other switch 2, 1, by the interpretation of the rising and falling edges of the voltage Vm at midpoint 3.

The fact that each synchronization system 10, 20 is dedicated to the activation of a switch 1, 2 also allows an interpretation of the RMS voltage variation Vm and a direct and fast transmission of the instruction to the switch.

DC-DC converters using fast switches 1, 2 switch the Vm signal in at least 5 ns (e.g., switching time between 5 and 20 ns); the synchronization system 10, 20 must have a response time lower than these values to minimize dead time and thus minimize losses during these switches.

The operation of the electronic device in half-bridge electronic device 100 according to the present disclosure will now be described with reference to the chronogram in FIG. 3.

As an example, slotted digital PWM input signal corresponds to an alternation of states 1 and 0. By means of a delay generation device 40, a first PWM-LS control signal, whose pulses are offset by a time $T_M$, and a second PWM-HS control signal, whose pulses are inverted and offset from the PWM input signal by a time $T_M$, are generated. The dead time $T_M$ is safely defined to prevent both switches 1, 2 from being activated simultaneously.

As shown in FIG. 3, the starting point of the chronogram corresponds to state 1 for the PWM input signal, which generates a first PWM-LS control signal in state 1 controlling the closing (activation) of the low level switch 1. The voltage Vm at midpoint 3 has a minimum value, typically 0.

When the PWM input signal changes to state 0, the PWM-LS control signal also changes to state 0 and the first control circuit 19 controls the deactivation (opening) of the low level switch 1. The voltage Vm at midpoint 3 increases to a maximum value, typically the voltage V.

The second synchronization system 20 interprets this rising edge of the voltage Vm to the midpoint 3 via its detection circuit 21. When the voltage Vm reaches its maximum value (or substantially earlier, depending on the set value of the voltage difference ($V_{c2}-V_{ref2}$)), the second synchronization system 20, via its processing circuit 25, generates the second ATON-HS synchronization signal, which combines with the PWM-HS control signal in the OR logic gate 28, to form the second $S_{HS}$ activation/deactivation signal: the second ATON-HS synchronization signal will switch the $S_{HS}$ signal into activation mode (state 1) to control the closing (activation) of the high level switch 2, within a shorter time tm than the $T_M$ delay for the PWM-HS control signal. The change to state 1 of the PWM-HS control signal then resets memory point 27 of processing circuit 25 of the second synchronization system 20 to 0 (reset).

As soon as the input signal changes to state 1, the PWM-HS control signal changes to state 0 and the second control circuit 29 controls the deactivation (opening) of the high level switch 2. The voltage Vm at midpoint 3 reduces until a minimum value, typically 0.

The first synchronization system 10 interprets this falling edge of the voltage Vm to the midpoint 3 via its detection circuit 11. When the voltage Vm reaches its minimum value (or substantially earlier, depending on the set value of the voltage difference ($V_{c1}-V_{ref1}$)), the first synchronization system 10, via its processing circuit 15, generates the first ATON-LS synchronization signal, which combines with the PWM-LS control signal in the OR logic gate 28, to form the second $S_{LS}$ activation/deactivation signal: the first ATON-LS synchronization signal will switch the $S_{LS}$ signal into activation mode (state 1) to control the closing (activation) of the low level switch 1, within a shorter time tm than the $T_M$ delay for the PWM-LS control signal. The change to state 1 of the PWM-LS control signal then resets memory point 17 of processing circuit 15 of the first synchronization system 10 to 0 (reset).

When the PWM input signal changes back to state 0, the PWM-LS control signal also changes to state 0 and the first control circuit 19 controls the deactivation (opening) of the low level switch 1, and so on. For each new alternating switching cycle of the switches 1, 2, the synchronization systems 10, 20 will alternately generate the ATON-LS and ATON-HS synchronization signals to activate one switch 1, 2 at the earliest after the other switch 2, 1 has been disabled.

Depending on a particular mode of operation, at least one of the switches 1, 2 of the half-bridge electronic device 100 includes a high-voltage transistor, which can switch voltages from several tens to a few hundred volts (e.g., 400V).

For example, the high-voltage transistor can be formed from III-N materials such as gallium nitride (GaN). The transistor could be a HEMT (high electron mobility transistor). Alternatively, the high voltage transistor can be formed of silicon.

According to another particular embodiment, at least one of the switches 1, 2 of the half-bridge electronic device 100 includes a high voltage transistor in depletion mode in series with a low voltage transistor in enrichment mode. The high-voltage transistor and the low-voltage transistor can form a cascode circuit, the gate of the high-voltage transistor being connected to the source of the low-voltage transistor. They can alternatively form a cascade circuit, the gate of the high voltage transistor being in this case controlled by a control circuit 19, 29.

The present disclosure also concerns a process for synchronizing the alternating activation of a low level switch 1 and a high level switch 2 in a half-bridge electronic device 100. The low level switch 1 and the high level switch 2 are controlled by a first $S_{LS}$ activation/deactivation signal and a second $S_{HS}$ activation/deactivation signal, respectively. The process consists of the following steps:

a) deactivating the low level switch 1 when a first PWM-LS control signal changes to state 0; the first PWM-LS control signal changes to state 0 as soon as the PWM input signal changes to state 0;

b) interpreting a variation following a rising edge of the voltage Vm at the midpoint 3 to generate a second synchronization signal ATON-HS capable of activating a high level switch 2;

c) the activation (passing mode) of the high level switch 2, by the second $S_{HS}$ activation/deactivation signal resulting from the combination, in a logic gate 28 of type OR, of the second ATON-HS synchronization signal and a second PWM-HS control signal;

d) deactivating the low level switch 1 when the second PWM-HS control signal changes to state 0; the second PWM-HS control signal changes to state 0 as soon as the PWM input signal changes to state 1;

e) interpreting a variation following a falling edge of the voltage Vm at the midpoint 3 to generate a first synchronization signal ATON-LS capable of activating a low level switch 1;

f) activating the low level switch 1, by the first $S_{LS}$ activation/deactivation signal resulting from the combination, in a logic gate 18 of type OR, of the first ATON-LS synchronization signal and a first PWM-LS control signal.

Steps a) to f) are repeated for each new cycle of alternating switching of the low level switch 1 and the high level switch 2.

Advantageously, the process includes a step c'), between step c) and step d), to reset the second ATON-HS synchronization signal; the reset occurs when the second PWM-HS control signal changes to state 1.

Advantageously, the process also includes a step f'), between step f) and the reiteration of step a), to reset the first ATON-LS synchronization signal; the reset occurs when the first PWM-LS control signal changes to state 1.

The interpretation of the variation according to a rising edge of the voltage Vm at midpoint 3 includes the detection of a determined high level of the voltage Vm. The high level determined may be the maximum value of the voltage Vm or alternatively a value significantly lower than the maximum value. The choice of the determined high level allows to generate, more or less soon after the low level switch 1 is deactivated, the second ATON-HS synchronization signal to activate the high level switch 2.

The interpretation of the variation according to a falling edge of the voltage Vm at midpoint 3 includes the detection of a determined low level of the voltage Vm. The low level determined may be the minimum value of the voltage Vm or alternatively a value significantly higher than the minimum value. The choice of the determined low level allows to generate, more or less soon after the high level switch 1 is deactivated, the first ATON-LS synchronization signal to activate the low level switch 1.

The half-bridge electronic device 100 and the process according to the present disclosure can be used in the field of DC-DC, AC-DC power converters, etc.

Of course, the invention is not limited to the described embodiments and alternative solutions can be used without departing from the scope of the invention as defined in the claims.

The invention claimed is:

1. An electronic half-bridge device, comprising:
   a high level switch and a low level switch in series, connected at a midpoint, the low level switch and the high level switch being respectively controlled by a first activation/deactivation signal and a second activation/deactivation signal, the electronic half-bridge device being able to form, from an input signal, a first control signal of the same polarity as the input signal and offset by a dead time, and a second control signal of reversed polarity with respect to the input signal and offset b a dead time;
   a first synchronization system including a first detection circuit configured to interpret a variation, along a falling edge, of a voltage (Vm) at the midpoint, the first synchronization system being configured to generate a first synchronization signal activated at a state 1 by the falling edge and reset to state 0 when the first control signal changes to state 1;
   a second synchronization system including a second detection circuit configured to interpret a variation, along a rising edge, of the voltage (Vm) at the midpoint, the second synchronization system being configured to generate a second synchronization signal activated at a state 1 by the rising edge and reset to state 0 when the second control signal changes to state 1;
   an OR logic gate combining the first synchronization signal with the first control signal, to form the first activation/deactivation signal; and
   another OR logic gate combining the second synchronization signal with the second control signal, to form the second activation/deactivation signal.

2. The device of claim 1, wherein each detection circuit comprises a capacitive element directly connected to the midpoint and configured to generate a transient current dependent on voltage variations at the midpoint.

3. The device of claim 2, wherein each detection circuit comprises, in series with the capacitive element, a diode and a shunt resistor, for measuring a voltage proportional to the transient current.

4. The device of claim 3, wherein each synchronization system includes a processing circuit configured to generate, from measurements of the detection circuit, the synchronization signal to activate the associated switch.

5. The device of claim 4, wherein each processing circuit comprises a voltage comparator and a memory point.

6. The device of claim 5, wherein at least one of the high- or low-level switches includes a high-voltage transistor.

7. The device of claim 6, wherein the high-voltage transistor is formed on the basis of GaN.

8. The device of claim 7, wherein at least one of the high- or low-level switches comprises a high voltage transistor in depletion mode in series with a low voltage transistor in enrichment mode.

9. A method for synchronizing an alternating activation of a low level switch and a high level switch in a half-bridge electronic device, comprising the following steps:
   a) deactivating the low level switch when a first control signal changes to state 0, wherein the first control signal is formed from an input signal and is of the same polarity as said input signal and offset by a dead time;
   b) interpreting a variation following a rising edge of a voltage at a midpoint, to generate a second synchronization signal capable of activating the high level switch, wherein the second synchronization signal is activated at a state 1 by the rising edge and reset to state 0 when a second control signal changes to state 1;
   c) activating the high level switch, by a second activation/deactivation signal resulting from combining the second synchronization signal with the second control signal in an OR logic gate;
   d) deactivating the high level switch when the second control signal changes to state 0, wherein the second control signal is formed from the input signal and is of reversed polarity with respect to said input signal and offset by a dead time;
   e) interpreting a variation following a falling edge of the voltage at the midpoint to generate a first synchronization signal capable of activating the low level switch, wherein the first synchronization signal is activated at a state 1 by the falling edge and reset to state 0 when the first control signal changes to state 1; and
   f) activating the low level switch, by a first activation/deactivation signal resulting from combining the first synchronization signal with the first control signal in another OR logic gate.

10. The method of claim 9, further comprising repeating steps a) to f) for each new cycle of alternating switching of the low level switch and the high level switch.

11. The device of claim 1, wherein each synchronization system includes a processing circuit configured to generate, from measurements of the detection circuit, the synchronization signal to activate the associated switch.

12. The device of claim 11, wherein each processing circuit comprises a voltage comparator and a memory point.

13. The device of claim 1, wherein at least one of the high- or low-level switches includes a high-voltage transistor.

14. The device of claim 13, wherein the high-voltage transistor is formed on the basis of GaN.

15. The device of claim 13, wherein at least one of the high- or low-level switches comprises the high-voltage transistor in depletion mode in series with a low-voltage transistor in enrichment mode.

* * * * *

UNITED STATES PATENT AND TRADEMARK OFFICE
CERTIFICATE OF CORRECTION

PATENT NO. : 11,114,940 B2  
APPLICATION NO. : 16/628236  
DATED : September 7, 2021  
INVENTOR(S) : Laurent Guillot et al.

Page 1 of 1

It is certified that error appears in the above-identified patent and that said Letters Patent is hereby corrected as shown below:

In the Specification

| | | |
|---|---|---|
| Column 1, | Line 32, | change "bridges, """ to --bridges,"-- |
| Column 2, | Line 13, | change "(Sus)" to --($S_{HS}$)-- |
| Column 3, | Line 18, | change first occurrence of "a step f)," to --a step f'),-- |
| Column 5, | Line 29, | change "current due" to --current $1_1$ due-- |
| Column 5, | Line 40, | change "Va" to --$V_{c1}$-- |
| Column 7, | Line 10, | change "slotted" to --a slotted-- |
| Column 8, | Line 64, | change "a step f)," to --a step f'),-- |

In the Claims

Claim 1, Column 9, Line 37, change "b a" to --by a--

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*